United States Patent
Riesel et al.

(10) Patent No.: US 7,869,079 B2
(45) Date of Patent: Jan. 11, 2011

(54) METHODS AND APPARATUS FOR PRINT JOB SUBMISSION

(75) Inventors: David Riesel, Palo Alto, CA (US);
Fumiaki Okushi, Daly City, CA (US);
Amit Jain, Foster City, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 1241 days.

(21) Appl. No.: 10/946,232

(22) Filed: Sep. 20, 2004

(65) Prior Publication Data

US 2006/0061823 A1     Mar. 23, 2006

(51) Int. Cl.
*G06F 15/00* (2006.01)
(52) U.S. Cl. ............... 358/1.18; 358/1.1; 358/1.13; 358/1.15; 358/1.16; 710/52; 710/301; 710/302
(58) Field of Classification Search ........... 358/1.18, 358/1.1, 1.13, 1.15, 1.16; 710/52, 301, 302
See application file for complete search history.

(56) References Cited

U.S. PATENT DOCUMENTS

| | | | | |
|---|---|---|---|---|
| 4,947,345 | A * | 8/1990 | Paradise et al. | 358/442 |
| 6,215,559 | B1 * | 4/2001 | Bryniarski et al. | 358/1.15 |
| 6,948,792 | B2 * | 9/2005 | Narusawa et al. | 347/19 |
| 7,173,730 | B1 * | 2/2007 | Suzuki et al. | 358/1.16 |
| 7,177,037 | B2 * | 2/2007 | Johnson | 358/1.15 |
| 2002/0060740 | A1 * | 5/2002 | Kato | 348/232 |
| 2003/0043395 | A1 * | 3/2003 | Takahashi | 358/1.13 |
| 2003/0078963 | A1 * | 4/2003 | Parry | 709/203 |
| 2003/0097495 | A1 * | 5/2003 | Hansen | 710/8 |
| 2003/0126328 | A1 | 7/2003 | Reilly | |
| 2004/0167974 | A1 | 8/2004 | Bunn et al. | |
| 2004/0201680 | A1 * | 10/2004 | Gennetten et al. | 348/207.1 |
| 2004/0218210 | A1 * | 11/2004 | Shozaki et al. | 358/1.15 |
| 2005/0120149 | A1 * | 6/2005 | Skarpness | 710/29 |

FOREIGN PATENT DOCUMENTS

| | | |
|---|---|---|
| EP | 0949804 A2 | 10/1999 |
| EP | 05795207.9 | 1/2008 |
| WO | PCT/US2005/032485 | 3/2006 |
| WO | PCT/US/2005/032485 | 3/2007 |

* cited by examiner

*Primary Examiner*—Edward L Coles
*Assistant Examiner*—Mark R Milia
(74) *Attorney, Agent, or Firm*—Glenn Patent Group; Michael A. Glenn

(57) ABSTRACT

Methods and apparatus are provided for submitting an electronic document to a printing system that includes a print controller having an input port and a print queue. Methods in accordance with this invention include coupling a portable media device to the input port, the portable media device including an electronic document and automatically copying the electronic document to the print queue. Apparatus in accordance with this invention include a portable media device that includes an electronic document. The portable media device is adapted to be coupled to the input port of the print controller, and the print controller is adapted to automatically copy the electronic document to the print queue.

10 Claims, 12 Drawing Sheets

METHODS AND APPARATUS FOR PRINT JOB SUBMISSION

BACKGROUND

This invention relates to print processing systems. More particularly, this invention relates to methods and apparatus for submitting print jobs to printing systems.

In recent years, software and hardware products for connecting computer equipment together to form networked computer systems has become more prevalent. For example, it is common today for computers to be connected together in computer networks. Such networked computer systems allow users to freely communicate information with one another. In addition, computer networks allow multiple computers to share computer resources, such as printers, copiers, facsimile machines, storage devices and other computer resources.

For example, FIG. 1 illustrates a previously known networked computer system that allows multiple users to share print output equipment. In particular, networked printing system 10 includes multiple client computers 12 coupled via network 14 to print controller 16 and printer 18. Client computers 12 may be desktop computers, laptop computers, handheld computers, computer workstations, personal digital assistants, cellular telephones, or other similar client computer devices. Network 14 may be a local area network, wide area network, wireless network, cellular network, the Internet, or other similar network or combination of such networks. Print controller 16 may be a computer device that, among other things, enables a print output device, such as printer 18, to function as a networked printer. Printer 18 may be a laser printer, inkjet printer, copier, plotter, printing press, or other similar print output device.

Client computers 12 may submit print jobs to print controller 16 for printing on printer 18. For example, a user of client computer $12_1$ may issue a print command from within application program $20_1$ (e.g., a page layout program), which may then call a print driver to create a print job. The print driver may create the print job in a page description language ("PDL"), such as PostScript, and may then submit the print job to print controller 16 via network 14. Print controller 16 may receive the print job via network interface 22, such as an Ethernet network interface card. Print controller 16 may include front-end application 24, which may be used to assign the received print job to one of print queues 26. Each print queue 26 may have an associated function. For example, print queue $26_1$ may be a high-priority queue for immediate printing, print queue $26_2$ may be a normal-priority queue for printing print jobs in sequential order, print queue $26_3$ may be a queue for holding print jobs for subsequent printing, and so on.

Front-end application 24 may include software that assigns incoming print jobs to print queues 26 based on various user-specified options. For example, if a user specifies that a print job is a "rush" job that requires immediate printing, front-end application 24 may assign the rush print job to print queue $26_1$. In contrast, if a user does not request priority processing, front-end application 24 may assign the normal-priority print job to print queue $26_2$. Back-end application 28 may include software and/or hardware that de-spools print jobs from print queues 26, converts print jobs from PDL to raster data, and then provides the raster data to printer 18 for printing.

Although this print workflow may be appropriate for many printing requirements, there are numerous instances in which such a networked print workflow is inconvenient or inapplicable. For example, a user without network access (e.g., a visitor) may find it very difficult to print a document on networked printing system 10. To do so, the visitor typically must send or provide an electronic copy of the document to a user of one of client computers 12 (e.g., via email), who may then submit the print job via network 14 to print controller 16. If the visitor does not have immediate email access, it may be very difficult to print the document. Although the visitor may have the document available on portable storage media (e.g., floppy disk), the computer usage policy at the visiting site may prohibit visitors from using client computers 12 for network printing. Further, the visitor may be reluctant to provide electronic copies of the document in this manner because the content may be easily copied by the user, or the content may be intercepted by an unauthorized user of network 14.

Likewise, previously known networked printing system 10 may be inappropriate for printing sensitive material, particularly if print controller 16 and printer 18 are located in a common area that may be accessed by numerous users. For example, a user of client computer $12_1$ may want to submit a confidential print job to print controller 16 for printing on printer 18. To prevent unintended viewing of the document by other users, the user may submit the print job, and then attempt to reach the printer 18 before printing begins. The user may not make it in time, or may get distracted on the way to printer 18. As a result, the document may be viewed by other users and document security may be compromised.

One possible solution to these problems is to provide print jobs to print controller 16 via portable storage media, such as a magnetic or optical disk. For example, if print controller 16 includes a CD-ROM drive and a user interface, the user may load a CD that includes a desired print job into the CD-ROM drive, and may then transfer the print job from the CD to one of print queues 26 via the user interface. Although this may solve the above-mentioned network access and security problems, this solution may be prohibitively costly, and may create other more serious security concerns. In particular, the addition of a dedicated magnetic or optical disk drive and user interface may substantially increase the cost of print controller 16, and therefore may be undesirable. As a result, many low-cost print controllers may not include such dedicated hardware, and thus this solution may not be available in all instances. Further, a system operator may be reluctant to provide a print controller 16 with a user interface that may be accessible to all users for fear that such access may be used to disrupt system resources.

In view of the foregoing, it would be desirable to provide methods and apparatus for submitting print jobs to networked print devices without requiring network access.

It further would be desirable to provide methods and apparatus for submitting print jobs to a networked print controller without requiring that the print controller include dedicated magnetic or optical storage readers.

It also would be desirable to provide methods and apparatus for submitting print jobs to a networked print controller without requiring that the print controller include a user interface.

SUMMARY

In view of the foregoing, it is an object of this invention to provide methods and apparatus for submitting print jobs to networked print devices without requiring network access.

It further is an object of this invention to provide methods and apparatus for submitting print jobs to a networked print controller without requiring that the print controller include dedicated magnetic or optical storage readers.

It also is an object of this invention to provide methods and apparatus for submitting print jobs to a networked print controller without requiring that the print controller include a user interface.

These and other objects of this invention are accomplished by providing methods and apparatus for submitting an electronic document to a printing system that includes a print controller having an input port and a print queue. In particular, methods in accordance with this invention include coupling a portable media device to the input port, the portable media device including an electronic document, and automatically copying the electronic document to the print queue. Apparatus in accordance with this invention include a portable media device that includes an electronic document. The portable media device is adapted to be coupled to the input port of the print controller, and the print controller is adapted to automatically copy the electronic document to the print queue.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

Figure 1:
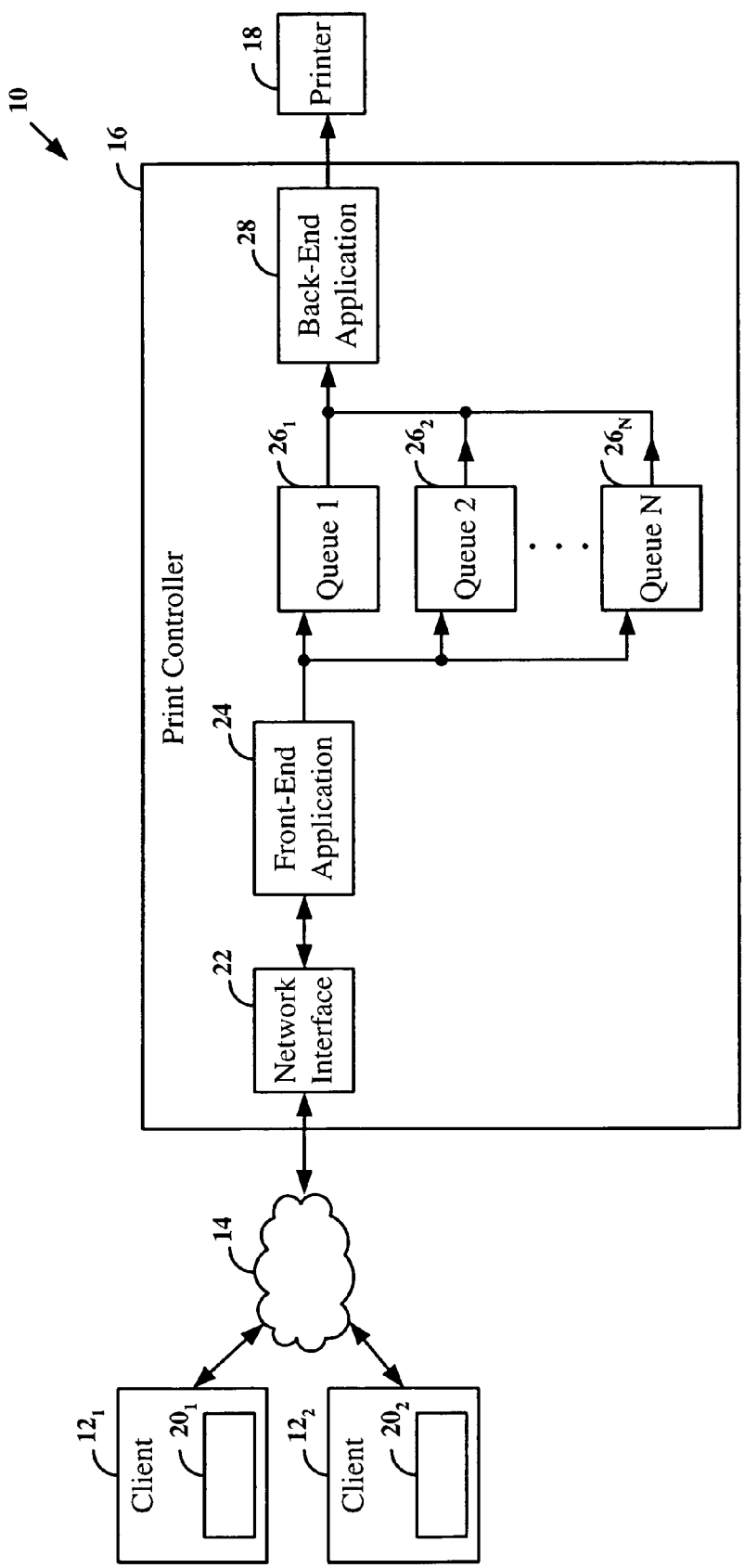
FIG. 1 is a block diagram of a previously known networked printing system 10.
Figure 2:
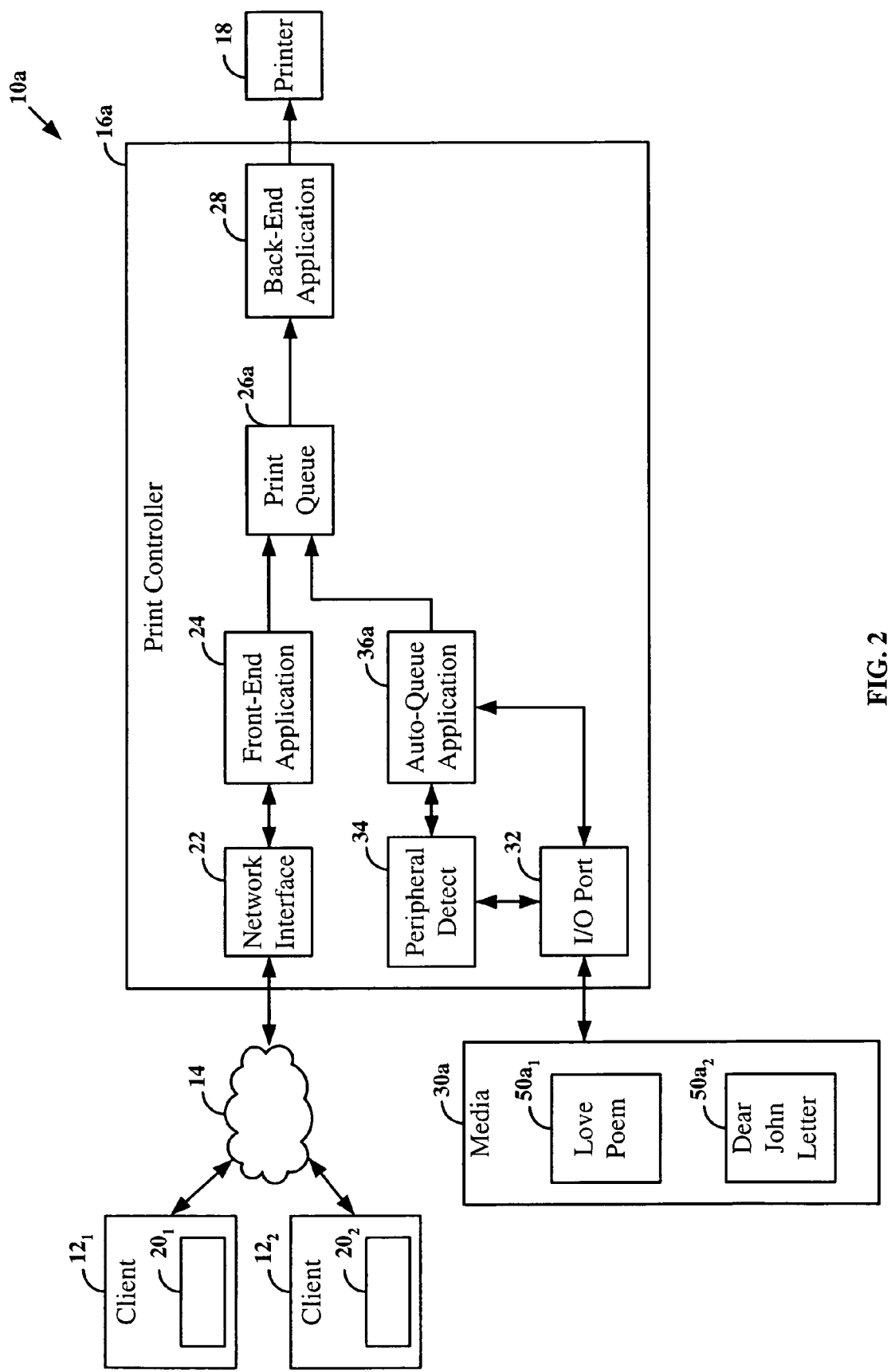
FIG. 2 is a block diagram of an exemplary printing system in accordance with this invention.

Referring now to FIG. 2, an exemplary printing system in accordance with this invention is described. In particular, printing system 10a includes portable media device 30a coupled via input/output ("I/O") port 32 to print controller 16a. Portable media device 30a may be a floppy disk, ZIP disk, optical disk, removable hard disk, microdrive, xD picture card, memory stick, SmartMedia, flash memory, universal serial bus ("USB") memory storage device or other similar portable media device. Portable media device 30a may include print jobs $50a_1$, ("Love Poem") and $50a_2$ ("Dear John Letter"). I/O port 32 may be a USB, High Performance Serial Bus (commonly called "FireWire"), or other similar I/O port. Depending on the device type, portable media device 30a may be directly connected to I/O port 32, or may be connected via a portable media drive device. For example, if portable media device 30a is a USB memory device, and I/O port 32 is a USB port, the portable media device may be plugged directly into I/O port 32. Alternatively, if portable media device 30a is a ZIP disk, and I/O port 32 is a FireWire port, the ZIP disk may be plugged into a portable ZIP drive that may be connected to I/O port 32 via a FireWire cable.

Print controller 16a may be a Fiery®, EDOX® or Splash® print controller by Electronics for Imaging, Inc., Foster City, Calif., U.S.A., or similar print controller. Printer 18 may be a laser printer, inkjet printer, dye-sublimation printer, copier, plotter, printing press, or other similar print output device. Print controller 16a may be separate from printer 18, such as a standalone print controller. Alternatively, print controller 16a may be included within the hardware and/or firmware of printer 18, such as in an embedded print controller.

Print controller 16a may include print queue 26a for receiving print jobs. Print controller 16a also may include back-end application 28, which may include software and/or hardware that may be used to de-spool print jobs from print queue 26a, convert the de-spooled print jobs to raster data, and then provide the raster data to printer 18 for printing.

Print controller 16a also may include peripheral detect application 34 and auto-queue application 36a. Peripheral detect application 34 may include hardware and/or software that may be used to invoke auto-queue application 36a when a peripheral device has been connected to I/O port 32. For example, if print controller 16a includes a Linux operating system, peripheral detect application 34 may include a "hot-plug" service that may be used to invoke auto-queue application 36a when a USB device has been connected to a USB I/O port 32. Similarly, if print controller 16a includes a Microsoft Windows operating system, peripheral detect application 34 may include a "plug and play" service that may be configured to invoke auto-queue application 36a when a FireWire memory device has been connected to a FireWire I/O port 32. Persons of ordinary skill in the art will understand that peripheral detect application 34 may be used to detect other types of peripheral devices that are coupled to other types of I/O ports on print controller 16a.

Peripheral detect application 34 also may provide auto-queue application 36a with information to identify the type of peripheral device coupled to I/O port 32. For example, each peripheral device that may be coupled to I/O port 32 may have an associated type code that identifies the device type. Thus, a first type code may be associated with USB portable memory devices, a second type code may be associated with FireWire memory devices, a third type code may be associated with USB keyboards, and so on. When a peripheral device is coupled to I/O port 32, peripheral detect application 34 may detect the type code associated with the peripheral device, invoke auto-queue application 36a, and provide the detected type code to the auto-queue application.

Figure 3:
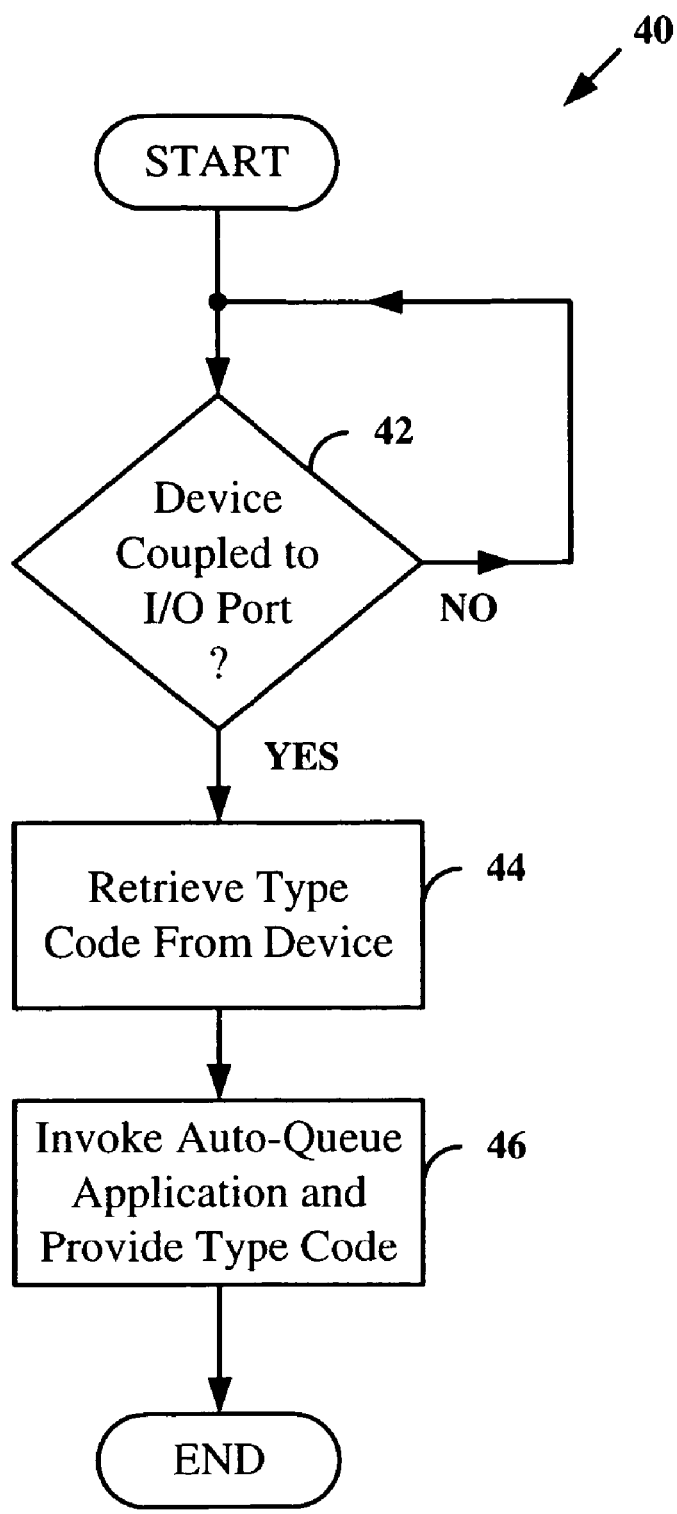
FIG. 3 is a flow diagram of an exemplary peripheral detection process in accordance with this invention.

FIG. 3 illustrates an exemplary peripheral detection process 40 performed by peripheral detect application 34. Beginning at step 42, peripheral detect application 34 checks for the presence of a peripheral device connected to I/O port 32. For example, peripheral detect application 34 may periodically poll I/O port 32 to detect the presence of a connected peripheral device. If no device is detected, the process returns to step 42 and continues to check for the presence of a connected peripheral device. If, however, peripheral detect application 34 detects a connected device, the process proceeds to step 44, wherein peripheral detect application 34 retrieves the associated type code from the connected device. At step 46, peripheral detect application 34 invokes auto-queue application 36a, and provides the auto-queue application with the type code retrieved at step 44. Process 40 then terminates.

Referring again to FIG. 2, auto-queue application 36a may be software and/or hardware that receives from peripheral detect application 34 the type code associated with the connected peripheral device, and determines if the received type code corresponds to a type of device (e.g., portable media device 30a) that may be used to store print jobs. If so, auto-queue application 36a may then copy print jobs from portable media device 30a to print queue 26a. Once the print jobs have been copied to print queue 26a, back-end application 28 de-spools the print jobs from print queue 26a, converts print jobs to raster data, and then provides the raster data to printer 18 for printing.

Figure 4:
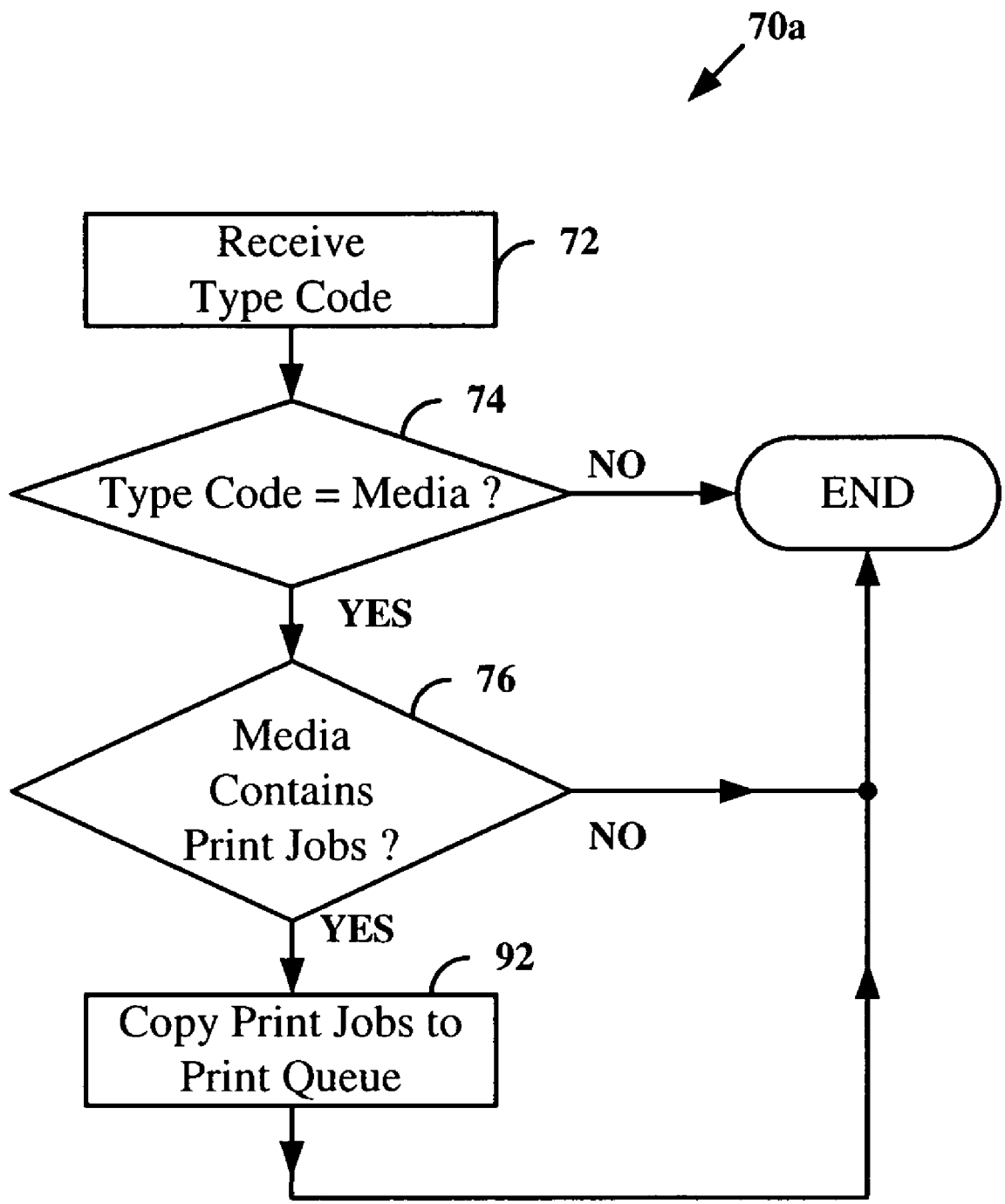
FIG. 4 is a flow diagram of an exemplary auto-queue process in accordance with this invention.

An exemplary auto-queue process 70a implemented by auto-queue application 36a is described with reference to FIGS. 2 and 4. In particular, beginning at step 72, auto-queue application 36a receives from peripheral detect application 34 the type code retrieved from the device coupled to I/O port 32. Next, at step 74, auto-queue application 36a determines if the received type code corresponds to a portable media device that may include stored print jobs. If not, the process ends. If, however, the received type code corresponds to such a portable media device (e.g., portable media device 30a), the process continues to step 76, and the auto-queue application determines if portable media device 30a includes any print jobs 50a. In this regard, auto-queue application 36a may search for files having file formats typically associated with print jobs, such as PostScript, PDF, PCL, TIFF, JPEG, or other similar file types. If portable media device 30a does not contain any print jobs 50a, the process ends. If, however, portable media device 30a includes print jobs 50a, the process proceeds to step 92, wherein print jobs 50a are copied to print queue 26a. Auto-queue process 70a then ends.

After print jobs 50a have been copied to print queue 26a, back-end application 28 de-spools print jobs 50a from print queue 26a, converts print jobs to raster data, and then provides the raster data to printer 18 for printing. Print jobs 50a may therefore be printed by print controller 16a and printer 18 without requiring that a user have access to network 14, or that print controller 16a include a dedicated magnetic or optical storage reader or user interface.

Figure 5:
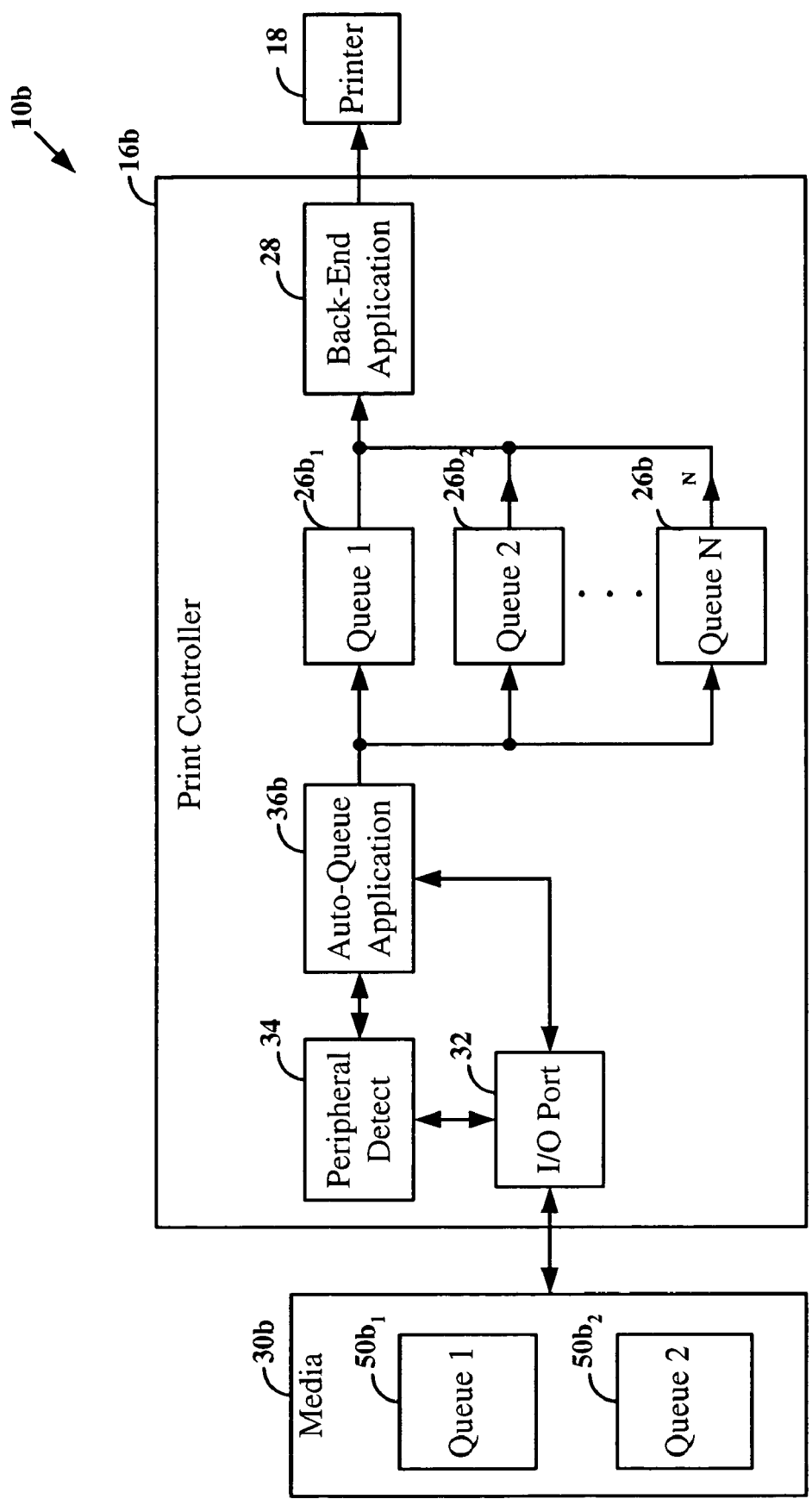
FIG. 5 is a block diagram of an alternative exemplary printing system in accordance with this invention.

Referring now to FIG. 5, an alternative exemplary print system in accordance with this invention is described. In particular, print system 10b includes portable media device 30b coupled via I/O port 32 to print controller 16b. For simplicity, client computers 12, network 14, network interface 22 and front-end application 24 have been removed from the drawing, although such elements may be part of print system 10b. Print controller 16b may include multiple print queues $26b_1, 26b_2, \ldots 26b_N$ for receiving print jobs, with each print queue having an associated name that may be used to uniquely identify the print queue. For example, print controller 16b may include print queues $26b_1, 26b_2, \ldots 26b_N$ having associated names "Queue 1," "Queue 2," . . . , and "Queue N," respectively, that may be used to uniquely identify the print queues.

Auto-queue application 36b may be software and/or hardware that receives from peripheral detect application 34 the type code associated with the connected peripheral device, and determines if the received type code corresponds to a type of device (e.g., portable media device 30b) that may be used to store print jobs. If so, auto-queue application 36b may then copy print jobs from portable media device 30b to print queues $26b_1, 26b_2, \ldots 26b_N$ based on queue assignment information included on portable media device 30b. Once the print jobs have been copied to print queue 26b, back-end application 28 de-spools the print jobs from print queue 26b, converts print jobs to raster data, and then provides the raster data to printer 18 for printing.

In this example, queue assignment information is included in the name of each print job 50b. That is, the name of each print job 50b indicates the print queue 26b that will receive a copy of the print job. Thus, if a user would like to have a print job $50b_1$ processed in a desired print queue 26b (e.g., print queue $26b_1$, named "Queue 1"), the user may name the print job "Queue 1." Similarly, if a user would like to have a print job $50b_2$ processed in another desired print queue 26b (e.g., print queue $26b_4$, named "Queue 2"), the user may name the print job "Queue 2." When portable media device 30b is connected to I/O port 32, peripheral detect application 34 invokes auto-queue application 36b, which copies print jobs 50b from portable media device 30b to print queues 26b based on print job names.

Figure 6:
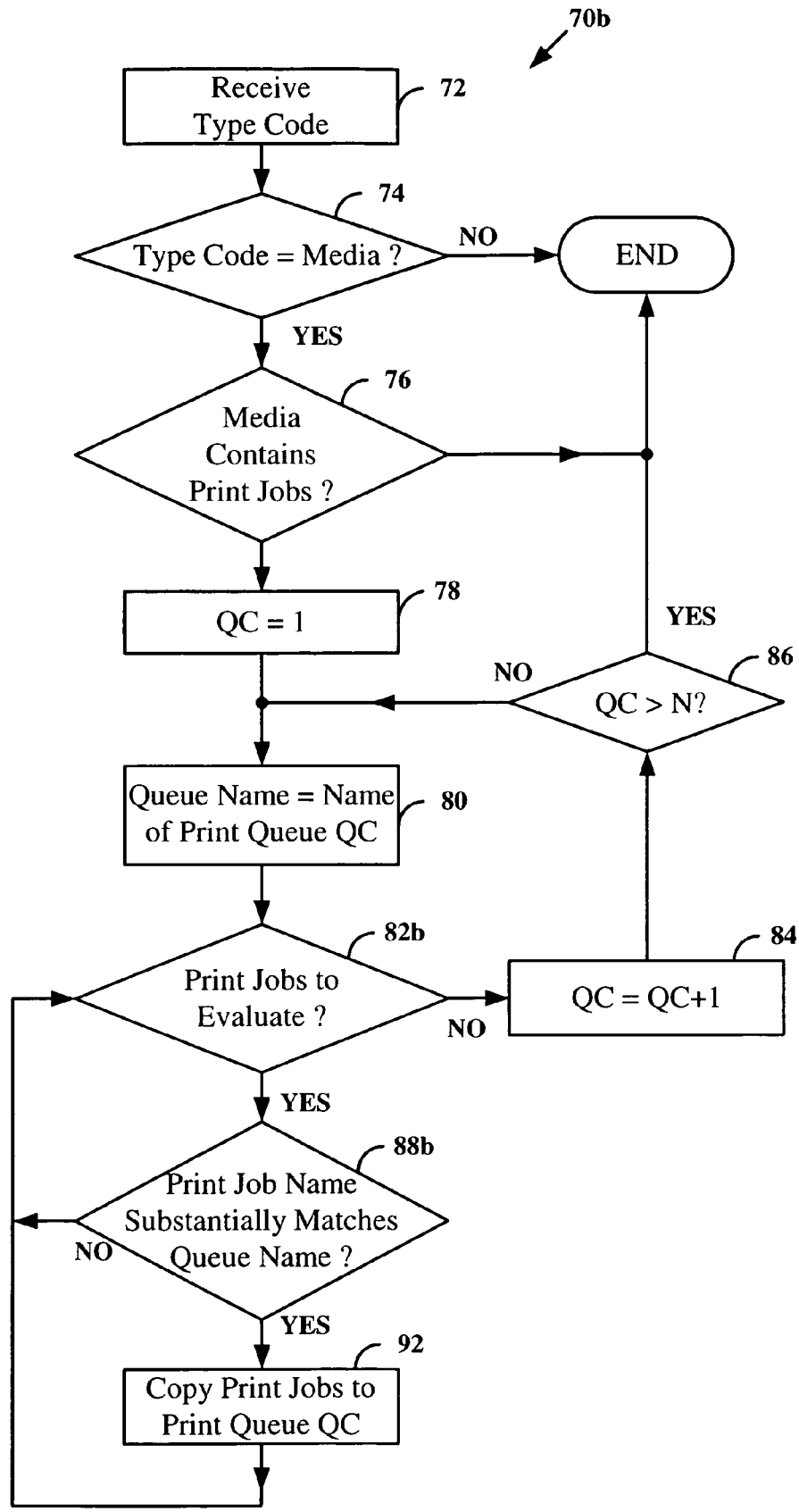
FIG. 6 is a flow diagram of an alternative exemplary auto-queue process in accordance with this invention.

An exemplary auto-queue process 70b implemented by auto-queue application 36b is described with reference to FIGS. 5 and 6. In this exemplary process, auto-queue application 36b first determines if the device coupled to I/O port 32 is a portable media device. If so, auto-queue application 36b examines each print job 50b on the portable media device, comparing the name of each print job 50b with the name of each print queue $26b_1, 26b_2, \ldots, 26b_N$. If the name of print job 50b substantially matches the name of a print queue 26b, auto-queue application 36b copies the print job 50b to the print queue 26b.

In particular, beginning at step 72, auto-queue application 36b receives from peripheral detect application 34 the type code retrieved from the device coupled to I/O port 32. Next, at step 74, auto-queue application 36b determines if the received type code corresponds to a portable media device that may include stored print jobs. If not, the process ends. If, however, the received type code corresponds to such a portable media device (e.g., portable media device 30b), the process continues to step 76, and the auto-queue application determines if portable media device 30b includes any print jobs 50b. In this regard, auto-queue application 36b may search for files having file formats typically associated with print jobs, such as PostScript, PDF, PCL, TIFF, JPEG, or other similar file types. If portable media device 30b does not contain any print jobs 50b, the process ends. If, however, portable media device 30b includes print jobs 50b, the process proceeds to step 78, wherein a variable QC is reset to an initial value (e.g., 1). QC may be an integer variable having values 1, 2, . . . , N, corresponding to print queues $26b_1, 26b_2, \ldots, 26b_N$, respectively. At step 80, a variable Queue Name is set to the name associated with print queue $26b_{QC}$. Thus, for QC=1, Queue Name="Queue 1." For QC=2, Queue Name="Queue 2," and so on.

Next, at step 82b auto-queue application 36b determines if portable media device 30b includes any print jobs 50b that must be evaluated, as described below. If there are no such print jobs 50b, at step 84 QC is incremented by 1. At step 86, the value of QC is compared to N. If QC is greater than N, the process stops. If, however, QC is less than or equal to N, the process returns to step 80, wherein variable Queue Name is set to the name associated with print queue $26b_{QC}$. At step 82b, auto-queue application 36b again determines if media device 30b includes any print jobs 50b that must be evaluated. This process continues until all print queues $26b_1, 26b_2, \ldots, 26b_N$ have been evaluated.

If at step 82b auto-queue application 36b determines that portable media device 30b includes a print job 50b that must be evaluated, the process continues to step 88b, wherein auto-queue application 36b determines if the name of print job 50b substantially matches Queue Name. If not, the process returns to step $82b$ to determine if portable media device $30b$ includes any other print jobs $50b$ that must be evaluated. This iterative process continues until the name of each of print jobs $50b$ has been compared to Queue Name. If at step $88b$ auto-queue application $36b$ determines that portable media device $30b$ includes a print job $50b$ having the a name that substantially matches Queue Name, the process continues to step $92$, wherein the print job $50b$ is copied to print queue $26b_{QC}$. The process then proceeds to step $82b$, as described above.

In this regard, auto-queue application $36b$ iteratively compares the name of each print job $50b$ with the name of each print queue $26b$, and copies print jobs $50b$ to the corresponding print queue $26b$ whose name substantially matches the print job name. After print jobs $50b$ have been copied to the appropriate print queue $26b$, back-end application $28$ de-spools print jobs $50b$ from print queues $26b$, converts print jobs to raster data, and then provides the raster data to printer $18$ for printing.

Figure 7:
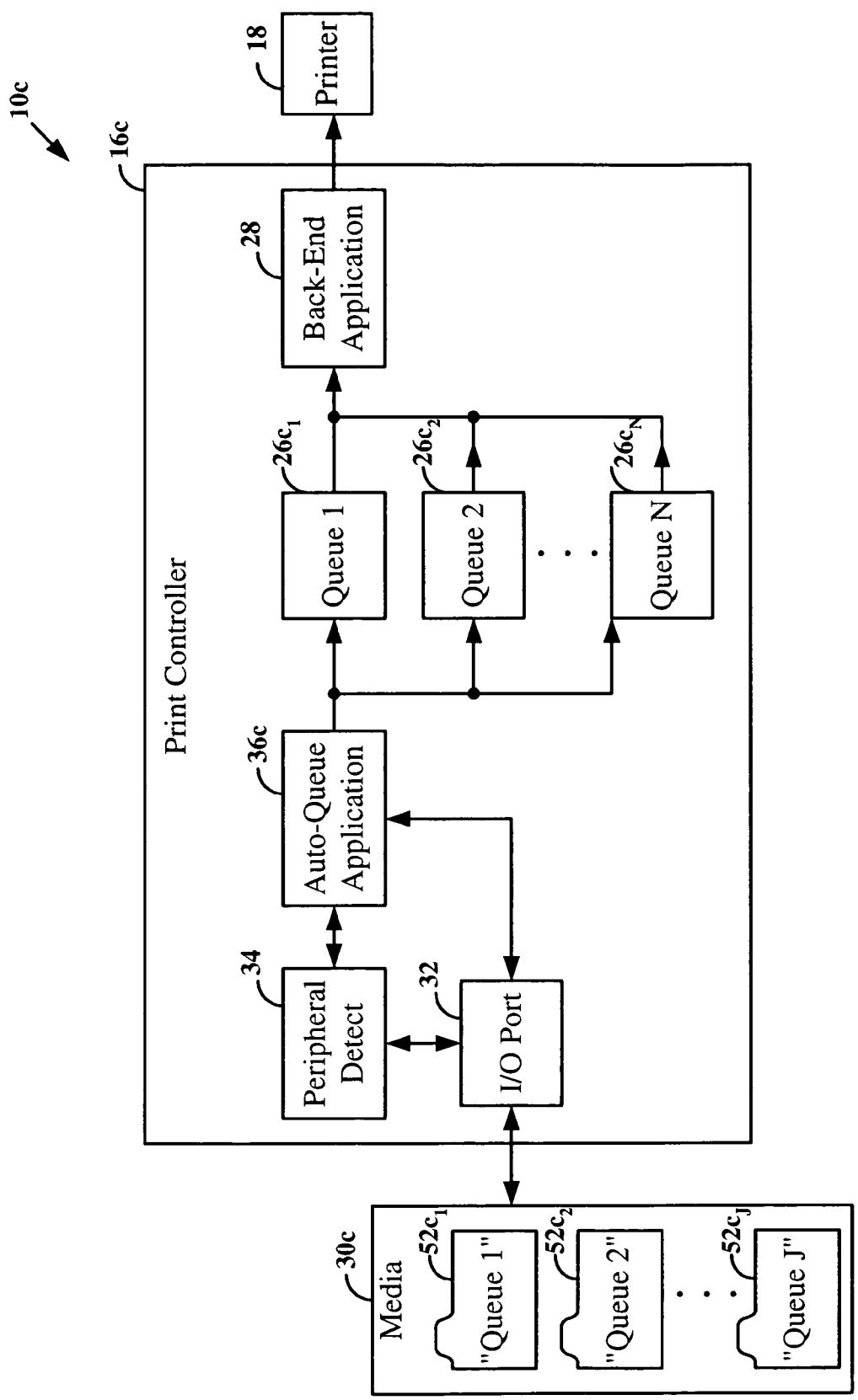
FIG. 7 is a block diagram of another alternative exemplary printing system in accordance with this invention.

Referring now to FIG. 7, another exemplary print system in accordance with this invention is described. In particular, print system $10c$ includes portable media device $30c$ coupled via I/O port $32$ to print controller $16c$, which is coupled to printer $18$. Print controller $16c$ includes auto-queue application $36c$, which also may copy print jobs from portable media device $30c$ to print queue $26c$ based on queue assignment information included on portable media device $30c$.

Figure 8A:
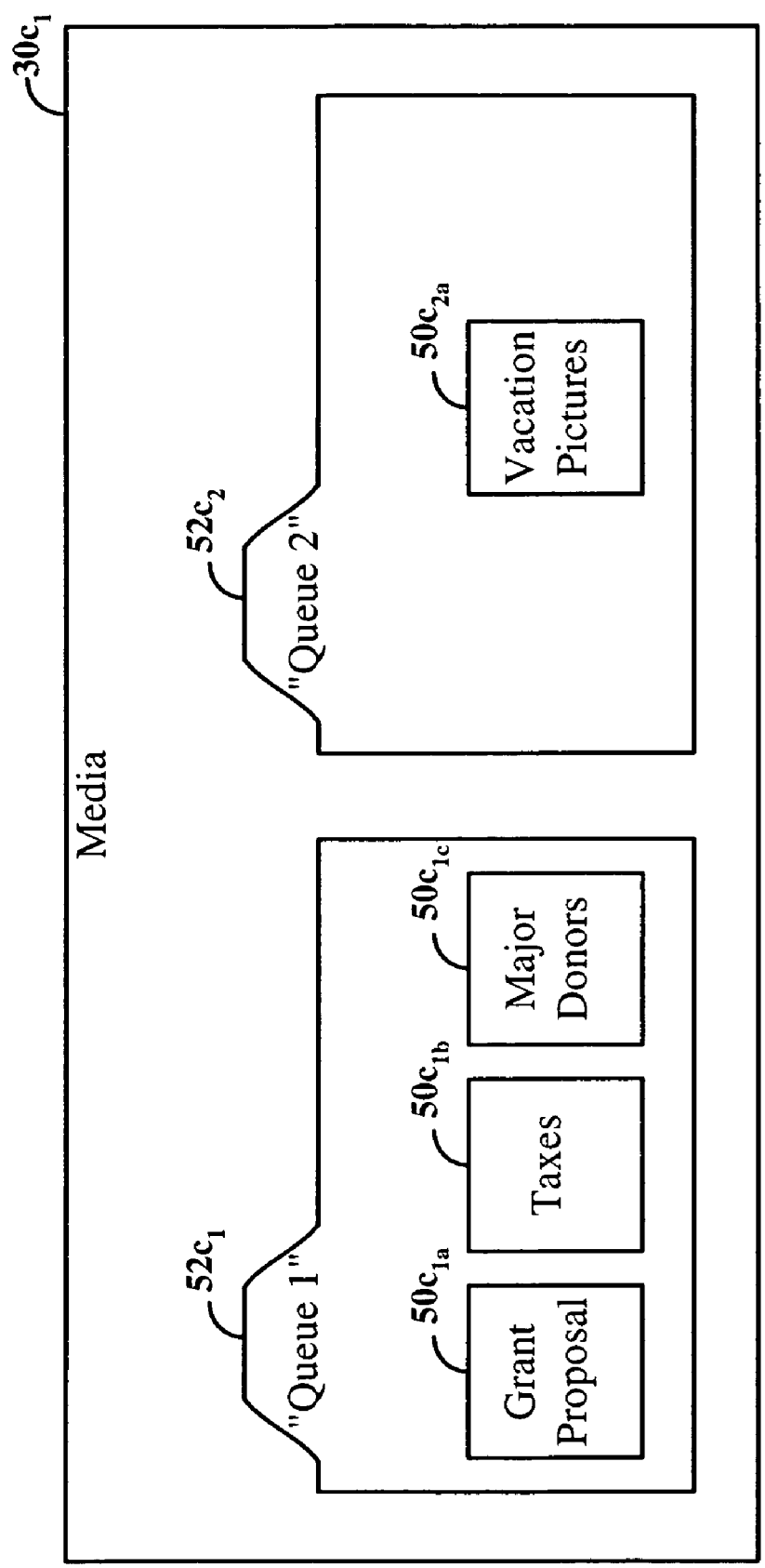
FIGS. 8A and 8B are diagrams of exemplary portable media devices for use with methods and apparatus in accordance with this invention.
Figure 8B:
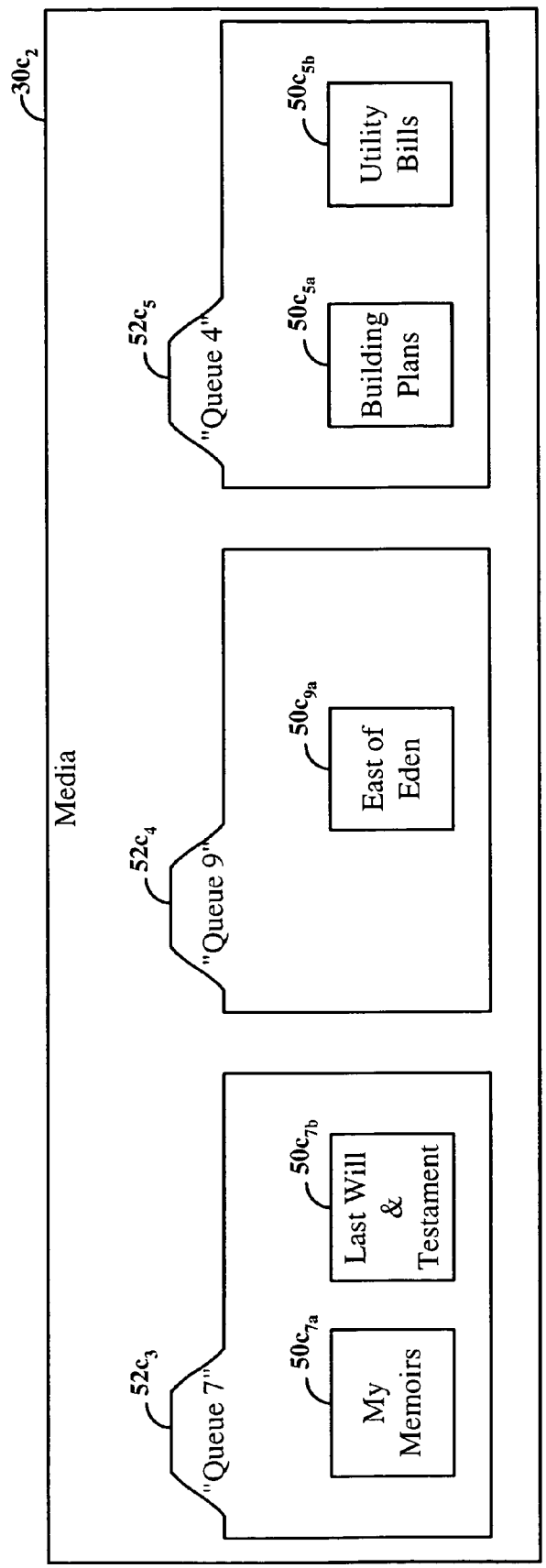

In this example, queue assignment information is included in the name associated with folders included in portable media device $30c$. Referring now to FIGS. 8A and 8B, exemplary portable media devices $30c_1$ and $30c_2$, respectively, are described. In particular, portable media device $30c_1$ may include folder $52c_1$, named "Queue 1" and folder $52c_2$, named "Queue 2," and portable media device $30c_2$ may include folder $52c_3$, named "Queue 7," folder $52c_4$, named "Queue 9," and folder $52c_5$, named "Queue 4." Folder $52c_1$ may include print jobs $50c_{1a}$ ("Grant Proposal"), $50c_{1b}$ ("Taxes") and $50c_{1c}$ ("Major Donors"), folder $52c_2$ may include print job $50c_{2a}$ ("Vacation Pictures"), folder $52c_3$ may include print jobs $50c_{7a}$ ("My Memoirs") and $50c_{7b}$ ("Last Will & Testament"), folder $52c_4$ may include print job $50c_{9a}$ ("East of Eden"), and folder $52c_5$ may include print jobs $50c_{5a}$ ("Building Plans") and $50c_{5b}$ ("Utility Bills").

In this exemplary system, queue assignment information is included in the name associated with each folder $52c$. That is, the name of each folder $52c$ indicates the print queue $26c$ that will receive print jobs $50c$ included in the folder. Thus, if a user would like to have a print job $50c$ processed in a desired print queue $26c$ (e.g., print queue $26c_1$, named "Queue 1"), the user may create a folder $52c$ in portable media device $30c$ that has an associated name "Queue 1," and may then include the print job in the "Queue 1" folder. Similarly, if a user would like to have a print job $50c$ processed in another desired print queue $26c$ (e.g., print queue $26c_4$, named "Queue 4"), the user may create a folder $52c$ in portable media device $30c$ that has an associated name "Queue 4," and may then include the print job in the "Queue 4" folder. When portable media device $30c$ is connected to I/O port $32$, peripheral detect application $34$ invokes auto-queue application $36c$, which copies print jobs $50c$ from portable media device $30c$ to print queues $26c$ based on the folder names included on portable media device $30c$.

Figure 9:
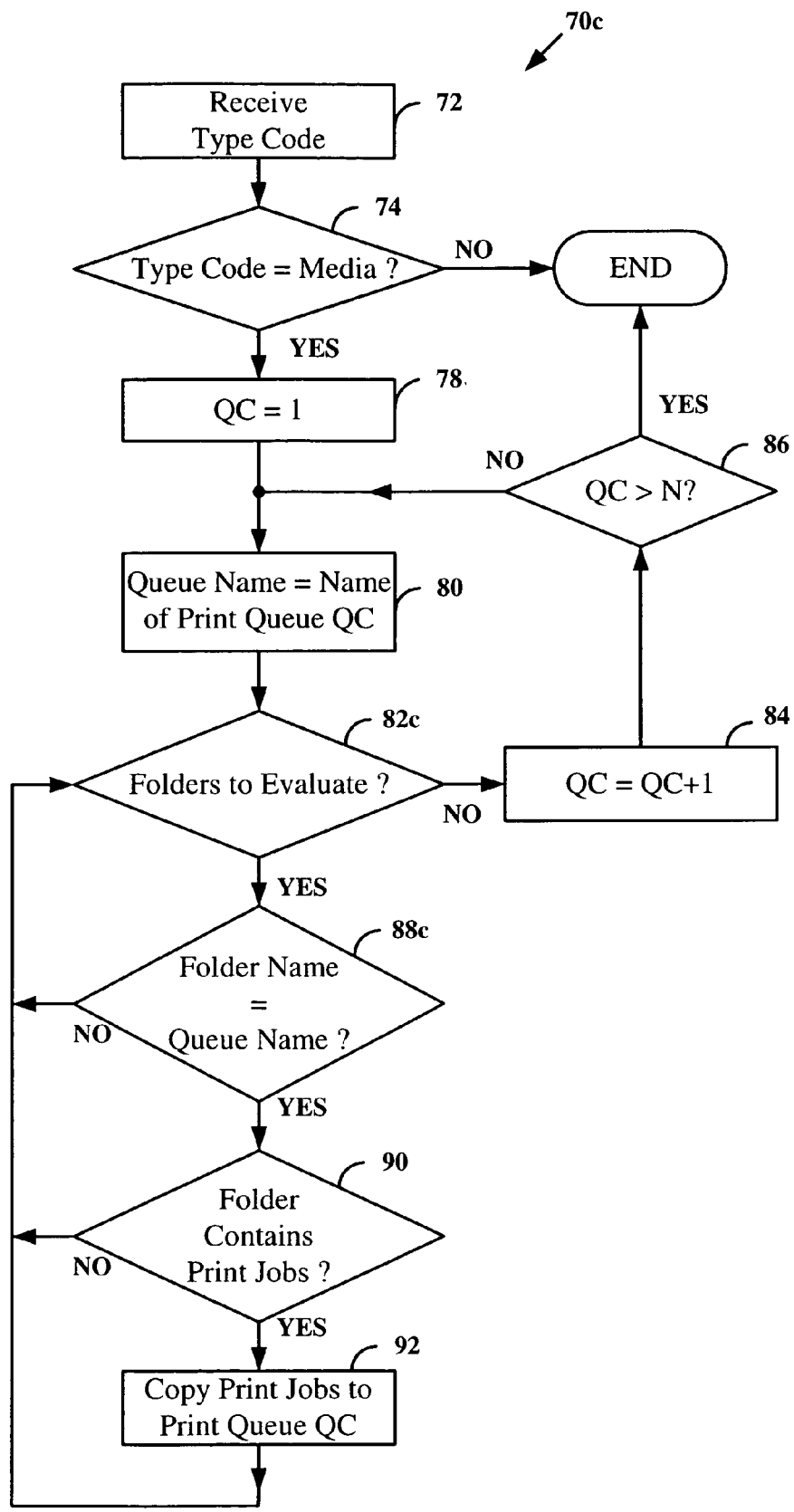
FIG. 9 is a flow diagram of another alternative exemplary auto-queue process in accordance with this invention.

An exemplary auto-queue process $70c$ implemented by auto-queue application $36c$ is described with reference to FIGS. 7 and 9. In this exemplary process, auto-queue application $36c$ first determines if the device coupled to I/O port $32$ is a portable media device. If so, auto-queue application $36c$ examines each folder on the portable media device, comparing the name of each folder $52$ with the name of each print queue $26$. If the name of folder $52c$ substantially matches the name of a print queue $26c$, auto-queue application $36c$ copies print jobs $50c$ to the substantially matching print queue $26c$.

In particular, beginning at step $72$, auto-queue application $36c$ receives from peripheral detect application $34$ the type code retrieved from the device coupled to I/O port $32$. Next, at step $74$, auto-queue application $36c$ determines if the received type code corresponds to a portable media device that may include stored print jobs. If not, the process ends. If, however, the received type code corresponds to such a portable media device (e.g., portable media device $30c$), the process continues to step $78$, wherein a variable QC is reset to an initial value (e.g., 1). QC may be an integer variable having values 1, 2, . . . , N, corresponding to print queues $26b_1, 26b_2, \ldots, 26b_N$, respectively. At step $80$, a variable Queue Name is set to the name associated with print queue $26c_{QC}$. Thus, for QC=1, Queue Name="Queue 1." For QC=2, Queue Name="Queue 2," and so on.

Next, at step $82c$ auto-queue application $36c$ determines if portable media device $30c$ includes any folders $52c$ that must be evaluated, as described below. If there are no such folders $52c$, at step $84$ QC is incremented by 1. At step $86$, the value of QC is compared to N. If QC is greater than N, the process stops. If, however, QC is less than or equal to N, the process returns to step $80$, wherein variable Queue Name is set to the name associated with print queue $26c_{QC}$. At step $82c$, auto-queue application $36c$ again determines if media device $30c$ includes any folders $52c$ that must be evaluated. This process continues until all print queues $26c_1, 26c_2, \ldots, 26c_N$ have been evaluated.

If at step $82c$ auto-queue application $36c$ determines that portable media device $30c$ includes a folder $52c$ that must be evaluated, the process continues to step $88c$, wherein auto-queue application $36c$ determines if the name of folder $52c$ substantially matches Queue Name. If not, the process returns to step $82c$ to determine if portable media device $30c$ includes any other folders $52c$ that must be evaluated. This iterative process continues until the name of each of folders $52c$ has been compared to Queue Name.

If at step $88c$ auto-queue application $36c$ determines that portable media device $30c$ includes a folder $52c$ having a name that substantially matches Queue Name, the process continues to step $90$, and the auto-queue application determines if folder $52c$ includes any print jobs $50c$. In this regard, auto-queue application $36c$ may search for files having file formats typically associated with print jobs, such as PostScript, PDF, PCL, TIFF, JPEG, or other similar file types. If folder $52c$ does not contain any print jobs $50c$, the process returns to step $82c$ to determine if portable media device $30c$ includes any other folders $52c$ that must be evaluated. If, however, folder $52c$ includes print jobs $50c$, the process proceeds to step $92$, wherein print jobs $50c$ in folder $52c$ are copied to print queue $26c_{QC}$. The process then proceeds to step $82c$, as described above.

In this regard, auto-queue application $36c$ iteratively compares the name of each folder $52c$ with the name of each print queue $26c$, and copies print jobs $50c$ from each folder $52c$ to the corresponding print queue $26c$ whose name substantially matches the folder name. After print jobs $50c$ have been copied to the appropriate print queue $26c$, back-end application $28$ de-spools print jobs $38$ from print queues $26c$, converts print jobs to raster data, and then provides the raster data to printer $18$ for printing.

Figure 10:
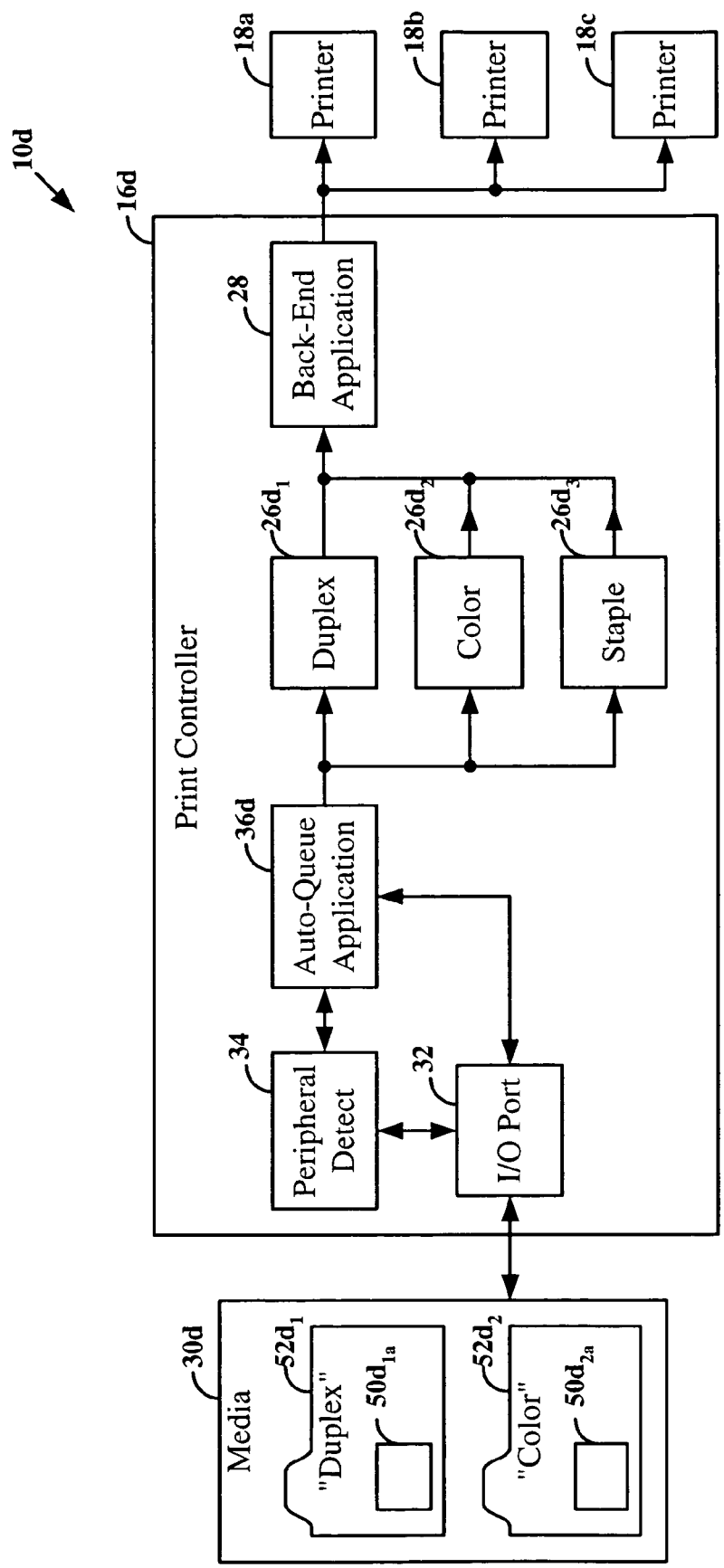
FIG. 10 is a block diagram of another alternative exemplary printing system in accordance with this invention.

Referring now to FIG. 10, another exemplary print system in accordance with this invention is described. In particular, print system $10d$ includes portable media device $30d$ coupled via I/O port 32 to print controller 16d, which is coupled to printers 18a, 18b and 18c. Print controller 16d includes print queue $26d_1$, named "Duplex," print queue $26d_2$, named "Color," and print queue $26d_3$, named "Staple." Printer 18a may include a duplex printing option, printer 18b may be a color printer, and printer 18c may include a staple option. Back end application 28 may be configured to send print jobs in Duplex print queue $26d_1$ to printer 18a with the duplex option selected, print jobs in Color print queue $26d_2$ to color printer 18b, and print jobs in Staple print queue $26d_3$ to printer 18c with the staple option selected.

Portable media 30d may include folder $52d_1$, named "Duplex," and folder $52d_2$, named "Color." Thus, if a user would like to have a print job $50d_{1a}$ duplex printed, the user may include the print job in Duplex folder $52d_1$. Similarly, if a user would like to have a print job $50d_{2a}$ printed on a color printer, the user may include the print job in Color folder $52d_2$. When portable media device 30d is connected to I/O port 32, peripheral detect application 34 invokes auto-queue application 36d, which copies print job $50d_{1a}$ from Duplex folder $52d_1$ to Duplex print queue $26d_1$, and print job $50d_{2a}$ from Color folder $52d_2$ to Color print queue $26d_2$. Back end application 28 then de-spools print jobs $50d_{1a}$ and $50d_{2a}$ from print queues $26d_1$ and $26d_2$, respectively, converts the print jobs to raster data, and then provides the raster data to printers 18a and 18b, respectively, for printing.

Figure 11:
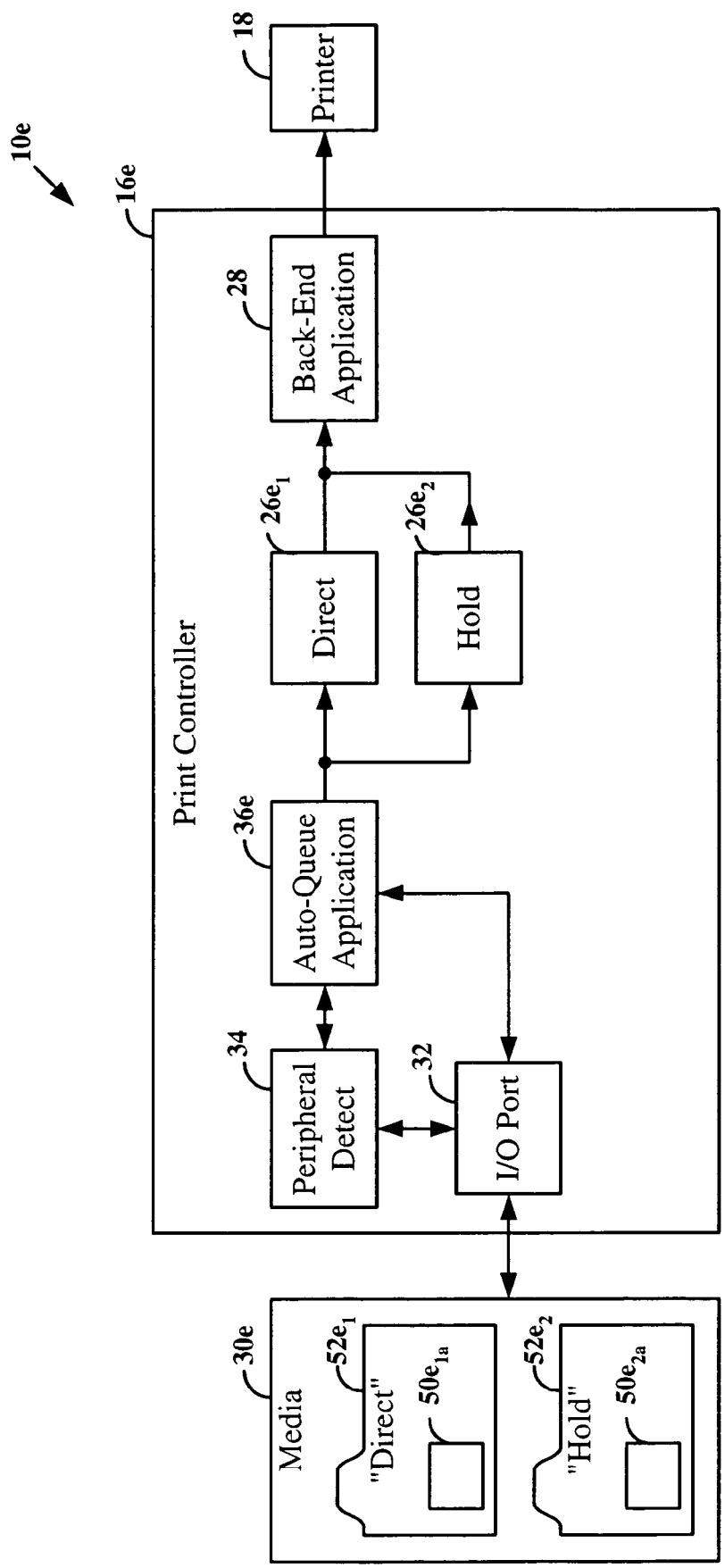
FIG. 11 is a block diagram of another alternative exemplary printing system in accordance with this invention.

As described above in connection with FIGS. 2, 5, 7 and 10, auto-queue application 36 searches portable media device 30 for files 50 having file formats typically associated with print jobs, such as PostScript, PDF, PCL, TIFF, JPEG, or other similar print job file formats. In some instances, however, a user may have documents that are not in one of these commonly used print job formats, but the user may nevertheless want to print the documents. For example, a user may have word processing (e.g., Corel WordPerfect), spreadsheet (e.g., Microsoft Excel), presentation graphics (e.g., Microsoft PowerPoint), page layout (e.g., Adobe Page Maker), computer aided design (e.g., Autodesk AutoCAD), image (e.g., bitmap), graphics (e.g., Apple MAC), markup (e.g., hypertext markup language ("HTML"), standard generalized markup language ("SGML"), extensible markup language ("XML")) or other similar "non-print job" format documents. FIG. 11 illustrates an alternative exemplary print system in accordance with this invention that may be used to print such non-print job format documents.

In particular, print system 10e includes portable media device 30e coupled to print controller 16e, which includes auto-queue application 36e, print queue $26e_1$, named "Direct," and print queue $26e_2$, named "Hold." Portable media device 30e may include folder $52e_1$, named "Direct," which may include Microsoft Word document $50e_{1a}$, and folder $52e_2$, named "Hold," which may include Word Perfect document $50e_{2a}$. When portable media device 30e is coupled to I/O port 32, auto-queue application 36e converts Microsoft Word document $50e_{2a}$ to PDF format, and then copies the PDF document to Direct print queue $26e_1$. Similarly, auto-queue application 36e converts Word Perfect document $50e_{2a}$ to PDF format, and then copies the PDF document to Hold print queue $26e_2$.

In this regard, auto-queue application 36e may include hardware and/or software that may be used to convert files 50e having any of a first set of formats (e.g., word processing, spreadsheet, presentation graphics, page layout, computer aided design, image, graphics or markup) to corresponding files in any of a second set of formats (e.g., PostScript, PDF, PCL, TIFF, JPEG, or other similar print job format). For example, auto-queue application 36e may include software such as Microsoft Office, WordPerfect Office, OpenOffice-.org productivity suite, or other similar software that may be used to convert documents from commonly used office application programs to PostScript, PDF, PCL, TIFF, JPEG, or other similar print job formats.

Alternatively, auto-queue application 36e may include hardware and/or software that may be used to send files 50e having any of a first set of formats (e.g., word processing, spreadsheet, presentation graphics, page layout, computer aided design, image, graphics or markup) to a server computer (not shown) for conversion to PostScript, PDF, PCL, TIFF, JPEG, or other similar print job formats. In this regard, the server computer may include includes software such as Microsoft Office, WordPerfect Office, OpenOffice.org productivity suite, or other similar software that may be used to convert documents from commonly used office application programs to PostScript, PDF, PCL, TIFF, JPEG, or other similar print job formats. After the server computer performs the conversion, the server computer may send the converted print job format documents to auto-queue application 36e for submission to print queues 26.

Persons of ordinary skill in the art will understand that various modifications can be made to this invention without departing from the scope and spirit of the invention. For example, auto-queue application 36 may include hardware and/or software that may limit the number of times that files 50 on portable media 30a may be copied to print queues 26. Thus, for example, portable media 30 may include an electronic copy of a book 50 that may be licensed or sold for single use printing on print controller 16 and printers 18. Alternatively, auto-queue application 36 may include hardware and/or software that may copy files 50 to print queues 26 only if the files 50 do not already exist on print queues 26, or only if the files 50 have been modified compared to the corresponding files in print queues 26.

Additionally, any of print controllers 16a-16e may include a user interface that may be used to manually select print jobs 50 from portable media 30 for copying to any of print queues 26 and printing by printer 18. In this regard, the user interface may be used to select print jobs from that are stored on portable media 30, but that do not have names or are not stored in folders 52 having names that include the names of print queues 26. Persons of ordinary skill in the art will understand that that other modifications also may be made without departing from the scope and spirit of this invention.

The invention claimed is:

1. A printing system for automatic print job submission comprising:
    a printer having an integral print controller comprising a universal serial bus port and a plurality of individually identifiable print queues, wherein said individually identifiable print queues are identified by a name that specifies print order, and wherein the print controller is configured with a peripheral device detection application; and
    a universal serial bus memory storage device configured with a plurality of folders, each folder configured for storing at least one electronic file, wherein the at least one electronic file is in a printable format and configured with queue assignment information, wherein the universal serial bus memory storage device is adapted to couple with the universal serial bus port, and wherein each folder is configured with a folder name that substantially corresponds with one or more of said plurality of individually identifiable print queues;
    wherein the print controller is configured to automatically copy the at least one electronic file in a printable format from at least one folder from among the plurality of folders to at least one of the corresponding individually identifiable print queues, and wherein the print controller is configured with an auto-queue application that is invoked by said peripheral device detection application when the universal serial bus memory storage device is physically coupled with the universal serial bus port of the print controller, such that said auto-queue application automatically initiates a print job, whereby automatic initiation of a print job includes such that automatic print job submission of said at least one electronic file from at least one folder with a name that substantially matches the name of at least one identifiable print queue to said matching individually identifiable print queue in an order specified by said print order without any further interaction by an operator of the printing system and printing a print job according to said print order.

2. The printing system for automatic print job submission of claim 1, wherein the queue assignment information comprises a name associated with the at least one electronic file in a printable format.

3. The printing system for automatic print job submission of claim 1, wherein:
the queue assignment information comprises a name associated with the at least one electronic file in a printable format; and
the print controller is further adapted to copy the at least one electronic file in a printable format to the at least one print queue whose name substantially matches the at least one electronic file in a printable format name.

4. The printing system for automatic print job submission of claim 1, wherein the at least one electronic file in a printable format comprises a print job.

5. The printing system for automatic print job submission of claim 4, wherein the print job comprises a page description language.

6. The printing system for automatic print job submission of claim 4, wherein the print job comprises at least one of a PostScript, PDF, PCL, TIFF, or JPEG format.

7. The printing system for automatic print job submission of claim 1, wherein the at least one electronic file in a printable format comprises a first format, and the print controller is further adapted to convert the copy of the at least one electronic file in a printable format to a second format.

8. The printing system for automatic print job submission of claim 7, wherein the first format comprises at least one of a word processing, spreadsheet, presentation graphics, page layout, computer aided design, image, graphics or markup format.

9. The printing system for automatic print job submission of claim 7, wherein the second format comprises at least one of a PostScript, PDF, PCL, TIFF, or JPEG format.

10. A method for automatically submitting an electronic document comprising:
providing a printer having an integral print controller comprising having a universal serial bus port and a plurality of individually identifiable print queues, wherein said individually identifiable print queues are identified by a name that specifies print order, and wherein the print controller is configured with a peripheral device detection application;
coupling a universal serial bus memory storage device with the input port of a print controller, the portable media device including a plurality of folders, each folder configured for:
storing at least one electronic file in a printable format,
specifying queue assignment information, and
corresponding with one or more of said plurality of individually identifiable print queues;
wherein the step of coupling said universal serial bus memory storage device with the input port of said print controller further comprises the step of invoking an auto-queue application stored on said universal serial bus memory storage device;
automatically copying the electronic at least one file from at least one folder form among the plurality of folders to at least one of the corresponding individually identifiable print queues, such that automatic print job submission of the at least one electronic file to at least one of the individually identifiable print queues occurs in an order specified by said print order when the portable media device is physically coupled with the input port of the print controller without any further interaction by an operator of the printing system; and
printing a print job according to said print order.

* * * * *